United States Patent [US 10,572,770 B2]
Park et al.
Feb. 25, 2020

(54) TANGENT CONVOLUTION FOR 3D DATA

(71) Applicant: Intel Corporation, Santa Clara, CA (US)

(72) Inventors: Jaesik Park, San Jose, CA (US);
Vladlen Koltun, Santa Clara, CA (US);
Maxim Tatarchenko, Freiburg (DE);
Qian-Yi Zhou, Belmont, CA (US)

(73) Assignee: Intel Corporation, Santa Clara, CA (US)

( * ) Notice: Subject to any disclaimer, the term of this patent is extended or adjusted under 35 U.S.C. 154(b) by 82 days.

(21) Appl. No.: 16/010,323

(22) Filed: Jun. 15, 2018

(65) Prior Publication Data

US 2019/0042883 A1 Feb. 7, 2019

(51) Int. Cl.
*G06K 9/00* (2006.01)
*G06K 9/62* (2006.01)
*G06K 9/46* (2006.01)

(52) U.S. Cl.
CPC ....... *G06K 9/6245* (2013.01); *G06K 9/00201* (2013.01); *G06K 9/4628* (2013.01); *G06K 9/6262* (2013.01); *G06K 9/6274* (2013.01); *G06K 9/6276* (2013.01)

(58) Field of Classification Search
CPC .. G06K 9/6245; G06K 9/6262; G06T 7/0075; G06T 7/0022; G06T 2207/10012; H04N 13/0239; H04N 13/0082
See application file for complete search history.

(56) References Cited

U.S. PATENT DOCUMENTS

| | | | | |
|---|---|---|---|---|
| 8,300,574 | B2* | 10/2012 | Ding | H04J 11/0033 370/203 |
| 8,848,933 | B2* | 9/2014 | Yoshioka | 381/66 |
| 9,824,435 | B2* | 11/2017 | Hishida | G01N 23/04 |
| 10,269,125 | B1* | 4/2019 | Kim | G06T 7/248 |
| 10,387,752 | B1* | 8/2019 | Kim | G06K 9/4642 |
| 10,395,313 | B1* | 8/2019 | Tang | G06K 9/6262 |
| 10,402,692 | B1* | 9/2019 | Kim | G06K 9/6256 |
| 2015/0146994 | A1* | 5/2015 | Arnison | G06T 7/571 382/254 |
| 2019/0012170 | A1* | 1/2019 | Qadeer | G06T 15/005 |
| 2019/0042883 | A1* | 2/2019 | Park | G06K 9/6262 |

OTHER PUBLICATIONS

Park, et al., "Tangent Convolutions for Dense Prediction in 3D", CVPR Conference, CVF, IEEE Computer Society, Salt Lake City Jun. 19-21, 2018, 11 pages, downloaded Apr. 30, 2018 submission approval.

* cited by examiner

*Primary Examiner* — Amir Alavi
(74) *Attorney, Agent, or Firm* — Compass IP Law PC

(57) ABSTRACT

To address the needs of applications that work with large-scale unstructured point clouds and other noisy data (e.g. image and video data), tangent convolution of 3D data represents 3D data as tangent planes. Tangent convolution estimates tangent planes for each 3D data point in one or more channels of 3D data. Tangent convolution further computes the tangent image signals for the estimated tangent planes. Tangent convolution precomputes the tangent planes and tangent image signals to enable convolution to be performed with greater efficiency and better performance than can be achieved with other 3D data representations.

20 Claims, 8 Drawing Sheets
(2 of 8 Drawing Sheet(s) Filed in Color)

700 – EXAMPLE CLASSIFICATION OF 3D DATA USING TANGENT CONVOLUTION PROCESS

704 – Color key for eight example classes

● Man made terrain ● Natural terrain ● High vegetation ● Low vegetation ● Building ● Hardscape ● Scanning artifacts ● Cars

US 10,572,770 B2

TANGENT CONVOLUTION FOR 3D DATA

TECHNICAL FIELD

The technical field relates generally to image processing and, in particular, to three-dimensional (3D) data processing for 3D images.

BACKGROUND ART

In image processing a convolution matrix, referred to as a kernel or mask, is a small matrix used to process image data for computer vision and related tasks. Convolution considers the local neighborhood of the image data as weighted by the kernel, enabling computer vision applications to make predictions about features of the image, such as in semantic segmentation or classification applications for scene analysis, object detection, coloration, searching and the like.

Computer vision applications have successfully used convolutional networks on two-dimensional (2D) image data. Because 2D convolution is defined on a regular grid it supports extremely efficient implementation using powerful deep architectures for processing large datasets at high resolution.

Data captured by 3D sensors, such as RGB-D (red, green, blue, depth) sensors in cameras and Li-DAR (Light Detection and Ranging) remote sensors, provide depth and other 3D data that is not captured in 2D images. However, using convolutional networks on 3D data is significantly more complex and computationally intense, especially for unstructured point clouds and other noisy real-world data. As a result, 3D data can present performance challenges when applying convolution to computer vision tasks such as scene analysis, object detection and the like.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The described embodiments are illustrated by way of example and not limitation in the figures of the accompanying drawings, in which like references indicate similar elements and in which.

Figure 1:
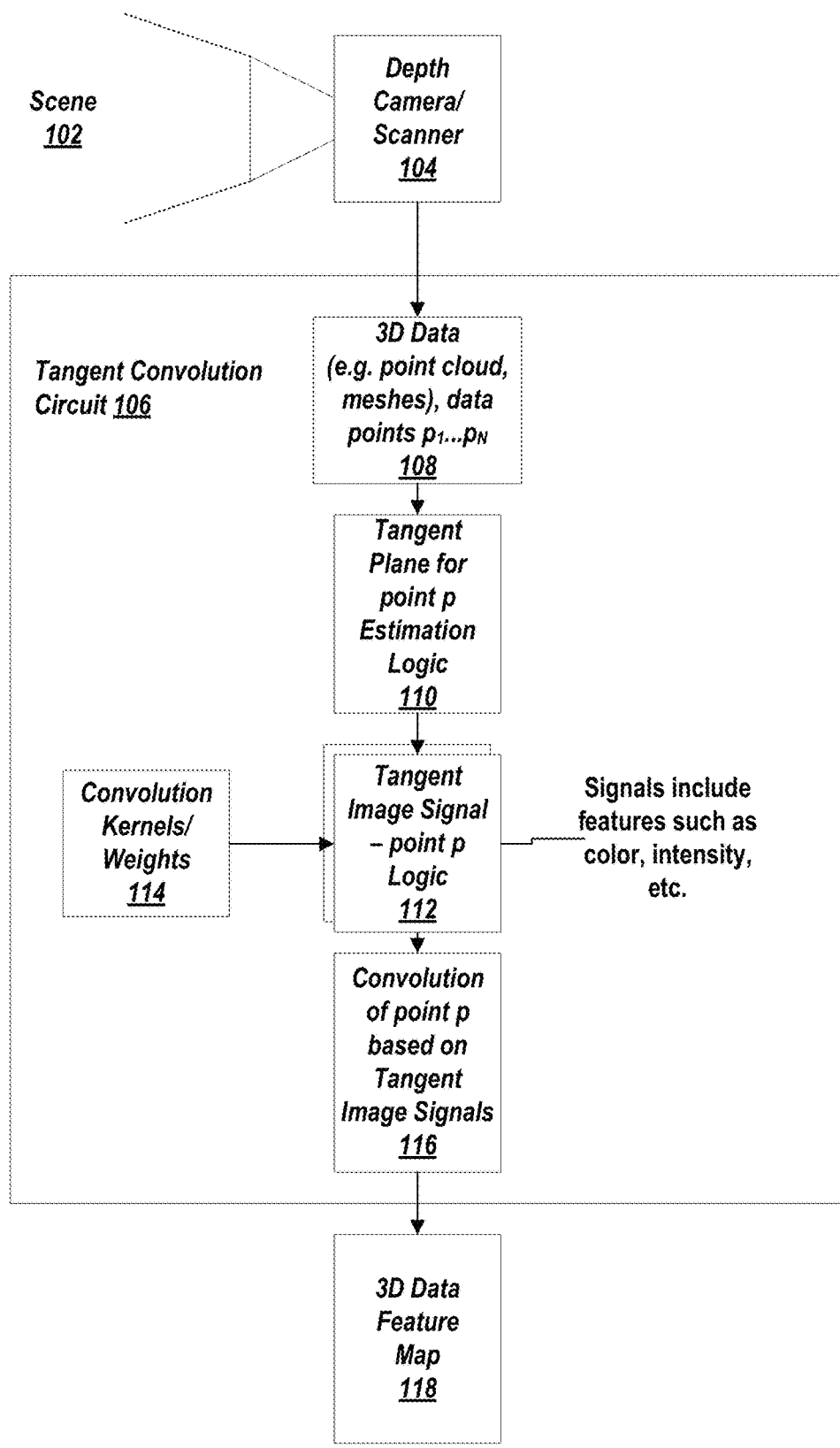
FIG. 1 is a schematic, block diagram illustration of components of apparatus to implement tangent convolution for 3D data in accordance with various examples described herein.

Other features of the described embodiments will be apparent from the accompanying drawings and from the detailed description that follows.

DESCRIPTION OF THE EMBODIMENTS

To address the needs of applications that work with large-scale unstructured point clouds and other noisy data (e.g. image and video data), tangent convolution of 3D data as herein described represents 3D data as tangent planes to enable deep learning through convolution with greater efficiency and better performance than can be achieved using other data representations.

For example, one common data representation of 3D data is a voxel grid. Analogous to a pixel in a bitmap, a voxel represents a value on a regular grid in three-dimensional space. Performing convolution on voxel grids entails a cubic growth rate of memory consumption and computation time. Due to the cubic complexity of voxel grids, these methods can only operate at low resolution typically not more than $64^3$ cubics—and have limited accuracy. For this reason, voxel-based convolutional networks operate on low-resolution voxel grids that limit their prediction accuracy.

To address the resolution issue with voxel grids, newer data representations based on hierarchical spatial data structures, such as octrees and Kd trees, can be more memory- and computation-efficient. But hierarchical spatial data structures also have an upper limit of voxel resolution that limit their prediction accuracy.

An alternative way of increasing the accuracy of voxel-based techniques is to add differentiable post-processing, modeled on a dense conditional random field (CRF). But performance is dependent on hand-crafted smoothness terms.

Still other applications of deep networks consider RGB-D images, a 2.5D representation of data that can be processed with fully-convolutional networks and graph neural networks. While a 2.5D representation supports the use of powerful pre-trained 2D networks, it is not generally applicable to unstructured point clouds captured with camera sensors with unknown sensor poses.

Another recent network for analyzing unordered point sets uses direct independent point processing combined with global context aggregation through max-pooling. But the communication between the points is quite weak which introduces problems when applied to large-scale scenes with complex layouts.

Overall, most existing 3D deep learning systems either rely on data representations that do not support general scene analysis or have significant scalability limitations, and generally fail to take into consideration the fact that data captured by 3D sensors, such as RGB-D cameras and Li-DAR, typically represent surfaces: 2D structures embedded in 3D space.

Whereas voxel-based deep learning techniques treat 3D data as volumetric by exploiting 3D convolutions that integrate over volumes, embodiments of tangent convolution as herein described takes advantage of the 2D nature of latent surfaces embedded in 3D space. Tangent convolution assumes that the 3D data is sampled from locally Euclidean surfaces. The latent surfaces need not be known, and the 3D data can be in any form that supports approximate normal vector estimation, including point clouds, meshes, and even polygon soup. The tangent convolution is based on projecting local surface geometry on a tangent plane around every point. This yields a set of tangent images. Every tangent image is treated as a regular 2D grid that supports planar convolution. The content of all tangent images can be precomputed from the surface geometry, which enables efficient implementation that scales to large datasets, such as 3D data representing urban environments.

In the description that follows, references to 3D data include one or more channels of data such as 3D point clouds and meshes. Because tangent convolution operates directly on surface geometry exhibited in 3D data, it is well-suited to processing unstructured point clouds and noisy real-world data and enables the design of a deep fully-convolutional network for analysis of 3D data and application to challenging real-world datasets of indoor and outdoor 3D environments. Deep networks based on tangent convolutions can scale to millions of 3D data points and are suitable for detailed analysis of large scenes.

In one embodiment, tangent convolution begins with a process to define a tangent plane for every point of N points in one or more input channels of 3D data. In one embodiment the tangent plane, also referred to as a tangent image, is defined by estimating a surface normal of point p in the 3D data.

In one embodiment, once the surface normal has been estimated, the process further estimates a tangent image signal for the tangent plane, where the tangent image signal is a continuous signal $S(u)$, where u represents any point in the tangent plane. Estimating the tangent image signal includes projecting onto the defined tangent plane any one or more neighboring points to point p to form a sparse geometric signal.

In one embodiment, the one or more neighboring points projected onto the tangent plane are selected based on their proximity to point p within a spherical region of 3D data surrounding point p. Proximity to point p is measured in terms of a neighborhood radius r that is used to determine the spherical region surrounding point p, where the one or more neighboring points that are projected onto the tangent plane are those points that fall within the spherical region.

In one embodiment, the size of the neighborhood radius r can be doubled during a pooling operation, where the pooling operation reiterates a tangent convolution over increasingly coarser grids to aggregate signals over larger spatial regions.

In one embodiment, the process to estimate the tangent image signal $S(u)$ continues with a process to densify the sparse geometric signal formed from the neighboring points that were projected onto the tangent plane. The process to densify the sparse geometric signal can be carried out using interpolation of the signals of the neighboring points projected onto the tangent plane to estimate a continuous signal over a tangent image represented by the tangent plane, referred to herein as the tangent image signal $S(u)$.

In one embodiment, interpolation is carried out using a nearest neighbor scheme that uses all nearest neighboring points. In one embodiment, interpolation is carried out using a Gaussian kernel mixture scheme that uses all or a subset of weighted neighboring points. In some embodiments, other interpolation schemes may be used to densify the sparse geometric signal, provided they allow the densification process to estimate the continuous signal $S(u)$ over the tangent image. Computation of the tangent image signal enables every 3D data point to be represented as a small image patch, i.e. the tangent image, thereby enabling the application of conventional convolutional networks to the 3D data.

In one embodiment, the tangent convolution process precomputes index matrices to represent the tangent planes of point p that are to be convolved, where the elements of the index matrix are indices to the 3D data points in the 3D data that were used during interpolation to estimate the continuous signal $S(u)$ of the tangent image at point p. The precomputed index matrices and kernel weights are used to efficiently compute the tangent convolution at point p. Efficiency is achieved, at least in part, because the tangent planes for each point p as well as the corresponding tangent image signals, index matrices and kernel weights can be pre-computed, thereby allowing more efficient computation using conventional convolution networks.

In one embodiment, the tangent convolution process implements two or more convolutional layers, each layer computing the tangent convolution at point p using successive larger radius r to estimate the tangent plane and the any one or more spherical neighboring points to point p that form the sparse geometric signal.

For ease of illustration, and by way of example only, the described embodiments of tangent convolution for 3D data refer to certain types of 3D data, such as point clouds and meshes. However other types of 3D data can be processed, provided that a surface normal to the 3D data can be estimated.

In the description that follows, examples may include subject matter such as a method, a process, a means for performing acts of the method or process, an apparatus, a memory device, and a system for tangent convolution of 3D data, and at least one machine-readable tangible storage medium including instructions that, when performed by a machine or processor, cause the machine or processor to performs acts of the method or process according to embodiments and examples described herein.

Numerous specific details are set forth to provide a thorough explanation of embodiments of the methods, media and systems for providing tangent convolution of 3D data. It will be apparent, however, to one skilled in the art, that an embodiment can be practiced without one or more of these specific details. In other instances, well-known components, structures, and techniques have not been shown in detail so as to not obscure the understanding of this description.

Reference in the specification to "one embodiment" or "an embodiment" means that a particular feature, structure, or characteristic described in connection with the embodiment can be included in at least one embodiment. The appearances of the phrase "in one embodiment" in various places in the specification do not necessarily all refer to the same embodiment.

The methods, processes and logic depicted in the figures that follow can comprise hardware (e.g. circuitry, dedicated logic, controllers, etc.), software (such as is run on a general-purpose computer system or a dedicated machine, e.g. a software module or logic), and interfaces (such as a memory interface) between hardware and software, or a combination of both. Although the processes and logic are described below in terms of some sequential operations, it should be appreciated that some of the operations described can be performed in a different order. Moreover, some operations can be performed in parallel rather than sequentially.

Turning now to FIG. 1, a schematic block diagram illustrates components of an apparatus for implementing tangent convolution in an image processing system in accordance with various examples described herein. Referring to FIG. 1, in some embodiments a depth camera and/or scanner 104 captures one or more channels of 3D data representing a scene 102, including complex indoor and outdoor scenes. The captured 3D data 108 is received in a tangent convolution circuit 106. The tangent convolution circuit 106 includes logic 110 for estimating a tangent plane for each point p in the 3D data 108. The tangent convolution circuit 106 includes a logic 112 for computing a tangent image signal of the tangent plane for each point p. The tangent image signal represents features of data points such as color, intensity, etc. In one embodiment, the logic 112 for computing the tangent image signal factors in the convolution kernel weights 114 that are pre-computed for convolving the 3D data. In one embodiment, the tangent image signals for each point p in the 3D data is pre-computed. The tangent convolution circuit 106 further includes logic 116 for convolving each point p in the 3D data based on the tangent image signal computed for the tangent plane. In one embodiment, the logic 116 includes logic for generating a 3D feature map based on the convolution of each point p in the 3D data.

Figure 2:
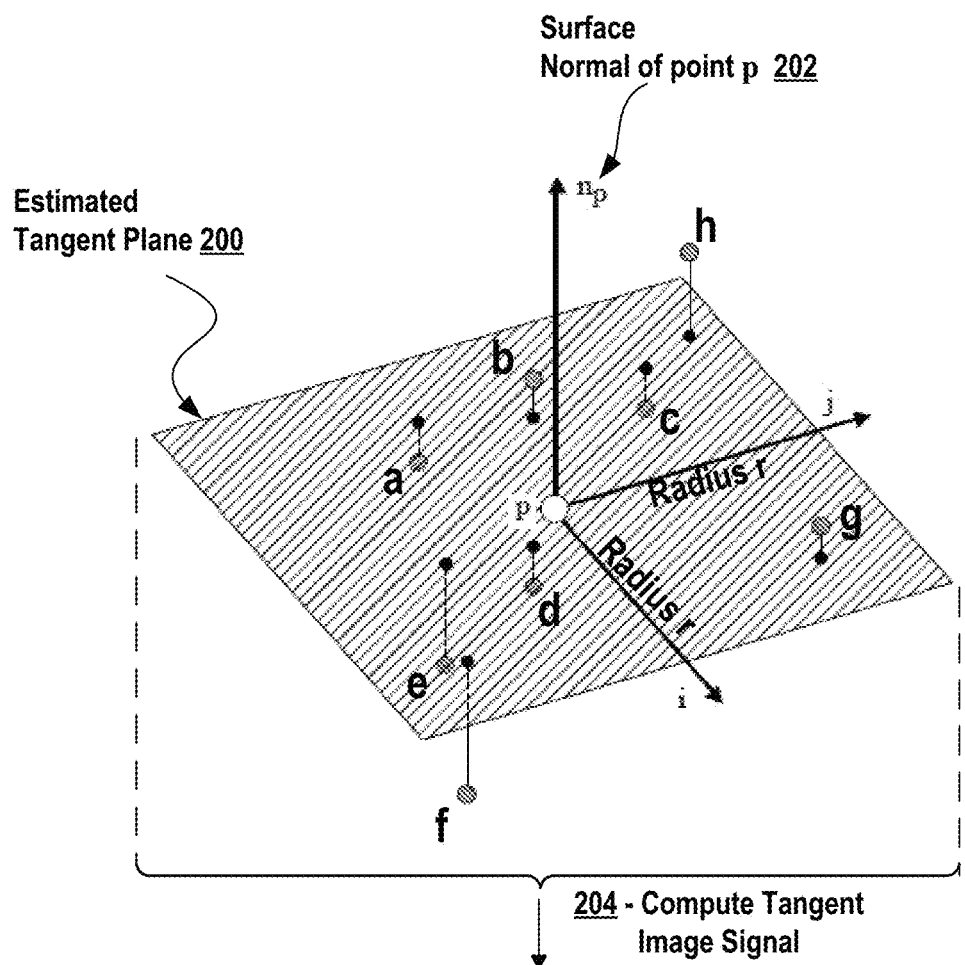
FIG. 2 is a schematic, block diagram illustration of certain aspects of implementing tangent convolution for 3D data in accordance with various examples described herein.

FIG. 2 is a schematic, block diagram illustration of certain aspects of implementing tangent convolution for 3D data in accordance with various examples described herein. If P represents a 3D data point cloud, then a discrete scalar function F(p) can be defined to represent a signal defined over P, where p is one of the points in the 3D data. F(p) can encode color, geometry, or abstract features from an intermediate network layer that is providing the 3D data. To convolve F, the discrete scalar function that it represents is extended into a continuous function as will be described with reference to FIG. 2.

In one embodiment, a virtual orthogonal camera is introduced to observe p along a normal $n_p$. The image plane of this virtual camera is referred to herein as the tangent plane of p. The tangent plane parameterizes a virtual image of point p, referred to herein as a tangent image, that can be represented as a continuous signal S(u), where u is a point on the tangent plane, including a point projected onto the tangent plane. The continuous signal S is referred to herein as the tangent image signal.

With reference to FIG. 2, in one embodiment, an estimated tangent plane 200 is defined by an estimated surface normal of point p 202 and the parameters i, j extending orthogonally from surface normal 202. In one embodiment, the orientation of the surface normal of point p 202 is estimated using local covariance analysis. By way of example only and for ease of illustration, a plurality of neighboring points a, b, c, d, e, f, g and h surround point p 202. Points a, c, d, e and f are located below the estimated tangent plane 200 and points b, g and h are above. One or more of the neighboring points are projected onto the estimated tangent plane 200 as illustrated to form a tangent image from which a tangent image signal S 206 can be computed 204, expressed as $$S(u)=\Sigma(w(u,v) \cdot S(v)), \quad [1]$$

where w (u, v) is a kernel weight that satisfies $\Sigma vw=1$, u represents point p, and v is the set of one or more points a, b, c, d, e, f, g, h projected onto estimated tangent plane 200 of point p.

Figure 3:
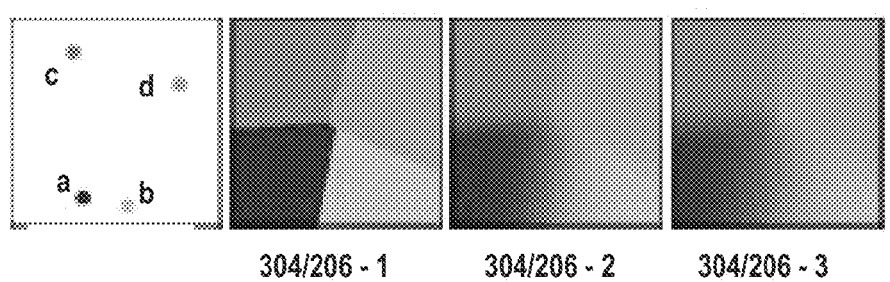
FIG. 3 is a schematic, block diagram illustration of further details of certain aspects of implementing tangent convolution for 3D data in accordance with various examples described herein.

FIG. 3 is a schematic, block diagram illustration of further details of certain aspects of implementing tangent convolution for 3D data in accordance with various examples described herein. Specifically, FIG. 3 illustrates an example interpolation 300 of a tangent image signal 206 S using point p's neighboring points on the estimated tangent plane 200 shown in FIG. 2.

In one embodiment, the sparse geometric signal 302 obtained by projecting the neighboring points a, b, c and d onto the estimated tangent plane 200 yields a set of scattered points that can be densified using interpolation to form a densified signal, also referred to herein as the tangent image signal S(u). By way of example only and not limitation, three different interpolation schemes are illustrated in FIG. 3 as follows: a nearest neighbor scheme 304/206-1, a full Gaussian mixture 304/206-2 and a Gaussian mixture with selected neighbors 304/206-3, e.g. the top-3 neighbors as determined through a weighting function or other characteristic.

In one embodiment, using the nearest neighbor interpolation scheme, $$w(u, v) = \begin{cases} 1 \\ 0 \end{cases} \text{if } v \text{ is } u\text{'s nearest neighbor then 1, otherwise 0.} \quad [2]$$

In another embodiment, using the Gaussian kernel mixture interpolation scheme, $$w(u, v) = \frac{1}{A}\exp\left(-\frac{\|u-v\|^2}{\sigma^2}\right) \quad [3]$$

where A normalizes the weights such that $\Sigma_v w=1$. Other interpolation schemes can be used.

Figure 4:
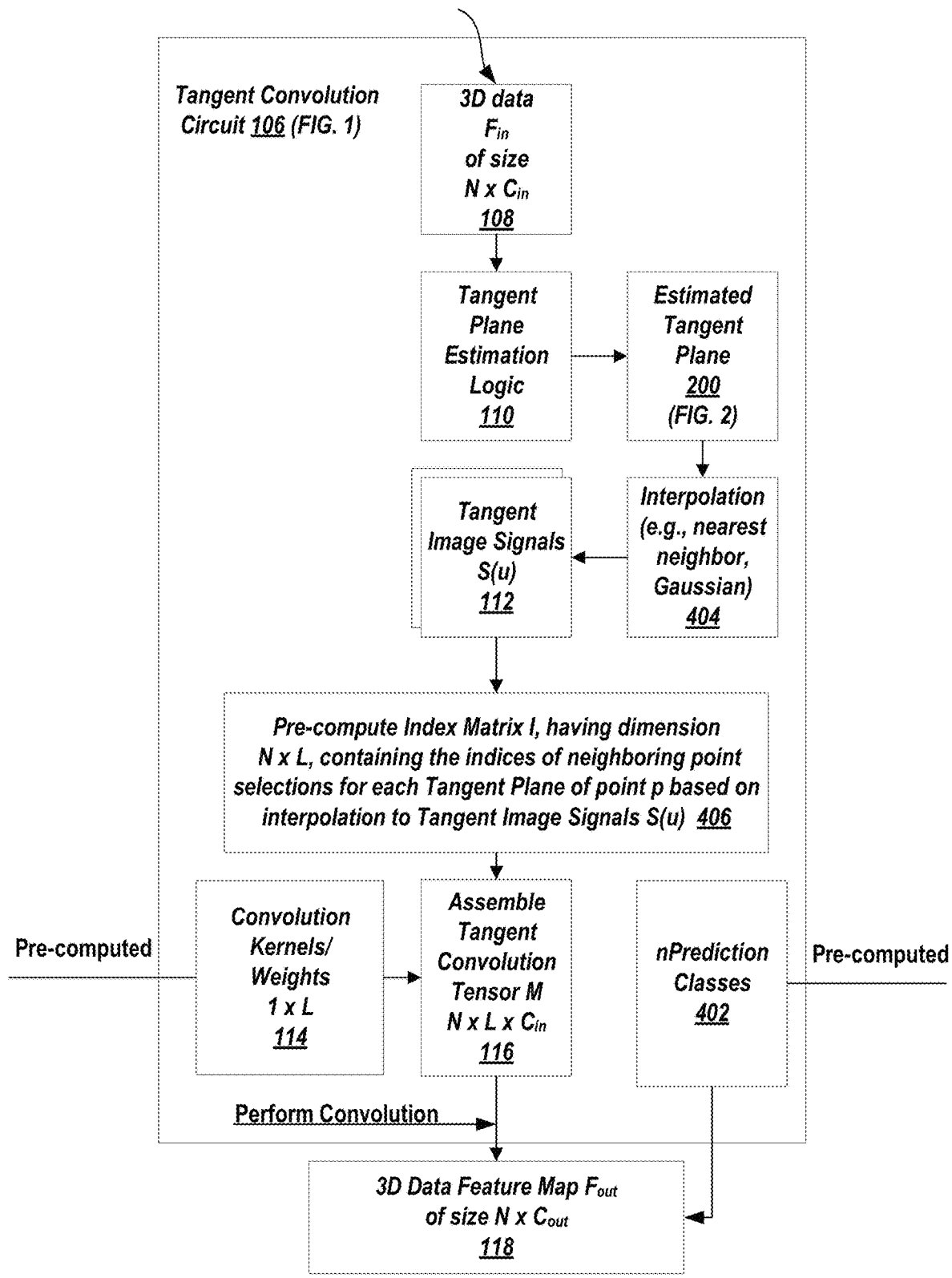
FIG. 4 is a schematic, block diagram illustration of further details of certain aspects of implementing tangent convolution for 3D data in accordance with various examples described herein.

FIG. 4 is a schematic, block diagram illustration of further details of certain aspects of implementing tangent convolution for 3D data in accordance with various examples described herein. Using the definition of a tangent image signal S for the set of points v projected onto the tangent plane, S can be mathematically defined as $$S(v)=F(q), \quad [4]$$

where, as previously noted, F is a discrete scalar function that represents a signal defined over a set of 3D data, such as a point cloud, and q is the set of 3D data points represented in F that are the neighboring points projected onto the tangent plane.

Using the expression for the tangent image signal S(u) in equation [1] and the above definition of the tangent image signal S for the set of projected neighboring points v in equation [4], the tangent convolution of a point p in the 3D data can be expressed as $$X(p)=\int_{\mathbb{R}^p} c(u) \cdot \Sigma_v(w(u,v) \cdot F(q))du \quad [5]$$

where c(u) is a discrete kernel applied to the tangent image represented by F(q), and w(u, v) represents the weight applied during interpolation. To compute the above tangent convolution expressed in equation [5] efficiently, the tangent image is treated as a discrete function on a regular l×l grid. Elements u are the pixels in the virtual image represented by the tangent image, where u includes point p and any of p's neighboring points projected onto the tangent plane, such as points a, b, c, d, e, f, g and h as illustrated in FIG. 2.

In one embodiment, using the nearest-neighbor interpolation scheme referenced in FIG. 3 and expressed in equation [2], the tangent convolution expressed in equation [5] can be rewritten as:

$$X(p)=\Sigma_u(c(u) \cdot F(g(u))), \quad [6]$$

where g(u) is a selection function that returns a point which projects to the nearest neighbor of u on the tangent image, such as one of the neighboring points a, b, c, d illustrated in FIG. 3. Because the selection function g only depends on the geometry of the 3D data and does not depend on the signal F, the selection function g can be precomputed for all points p in the 3D data.

With reference to FIG. 4, in one embodiment, the tangent convolution expressed in equation [5] is implemented in a convolutional network where the goal is to convolve an input feature map 108 $F_{in}$ of size $N \times C_{in}$, where in is the number of input channels, with a set of weights W 114 to produce an output feature map 118 $F_{out}$ of size $N \times C_{out}$, where out is the number of output channels and N is the number of points in the 3D data.

Prior to beginning the convolution computations, the tangent convolution circuit 106 first completes the tangent plane estimation logic 110 to estimate the tangent plane 200 for each point p, and interpolates 404 the neighbors of each point p to obtain the tangent image signals S(u) for all points p represented in input feature map 108 $F_{in}$. In one embodiment, the tangent image signals S and any convolutional filters of size l×l are transformed into one-dimensional vectors of size 1×L, where $L=l^2$.

In one embodiment, the tangent convolution circuit 106 pre-computes the g(u) selection function that returns a point which projects to the nearest neighbor of any point u on u's tangent plane, such as one of the neighboring points a, b, c, d illustrated in FIG. 3 for point p. In convolution terms, the g(u) selection function is implemented as an index matrix I, having dimension L×N, where each pre-computed element of I is an index to point u's tangent plane's nearest neighbor points in the 3D data.

In one embodiment, the pre-computed elements of the index matrix I are used to assemble 116 input signals (features) of the input feature map 108 $F_{in}$ into an intermediate tensor M of size $N \times L \times C_{in}$. Once assembled, the tangent convolution circuit 106 can perform convolution on the tensor M with a flattened set of convolution Kernels/Weights 114 to produce the output feature map 118 $F_{out}$.

In one embodiment, when the signal interpolation is implemented using one of the more complex interpolation schemes, such as the Gaussian kernel mixture scheme with top-3 neighboring points such as illustrated in equation [3] above, an additional pre-computation step is added to compute a weighted sum of the tensor M.

Recall that during the Gaussian interpolation, weights of the neighboring points are normalized such that $\Sigma_v w=1$. Therefore, each data point u has at most k non-zero weights, denoted by $w_{1 \ldots k}(u)$ corresponding to selection functions $g_{1 \ldots k}(u)$. Because both the weights and the selection functions are independent of the signal F, they can be precomputed the same as the nearest-neighbor signal interpolation.

Therefore, in one embodiment, using convolution terms, each precomputed selection function $g_{i=1 \ldots k}$ can be represented in a corresponding index matrix $I_{i=1 \ldots k}$ to assemble k intermediate signal tensors $M_{i=1 \ldots k}$. Similarly, the precomputed k non-zero weights $w_{1 \ldots k}(u)$ are collated into k weight matrices, $H_{i=1 \ldots k}$, with the same size as the regular tensor M, N×L. The k weight matrices, $H_{i=1 \ldots k}$, are used to compute a weighted sum during assembly of the tensor, $M=\Sigma_i H_i \odot M_i$, where the weighted sum of tensor M is convolved with the convolution kernel weight W during convolution, the same as for the simpler nearest neighbor interpolation.

Lastly, with reference again to FIG. 4, in one embodiment, a pre-computed number of prediction classes, nPrediction Classes 402, is used to classify portions of the output feature map 118 $F_{out}$ generated through convolution in accordance with the convolution result for the data points. For example, the prediction classes may be used in semantic segmentation applications to identify or to color portions of the output feature map, such as identifying a car or other object during computer vision tasks for autonomous driving. Still other applications include pedestrian/obstacle detection from 3D Lidar (Light Detection and Ranging) scans for autonomous driving, quality assessment and refinement for raw 3D scans, point cloud colorization, and searching and retrieving information from 3D scans.

Figure 5:
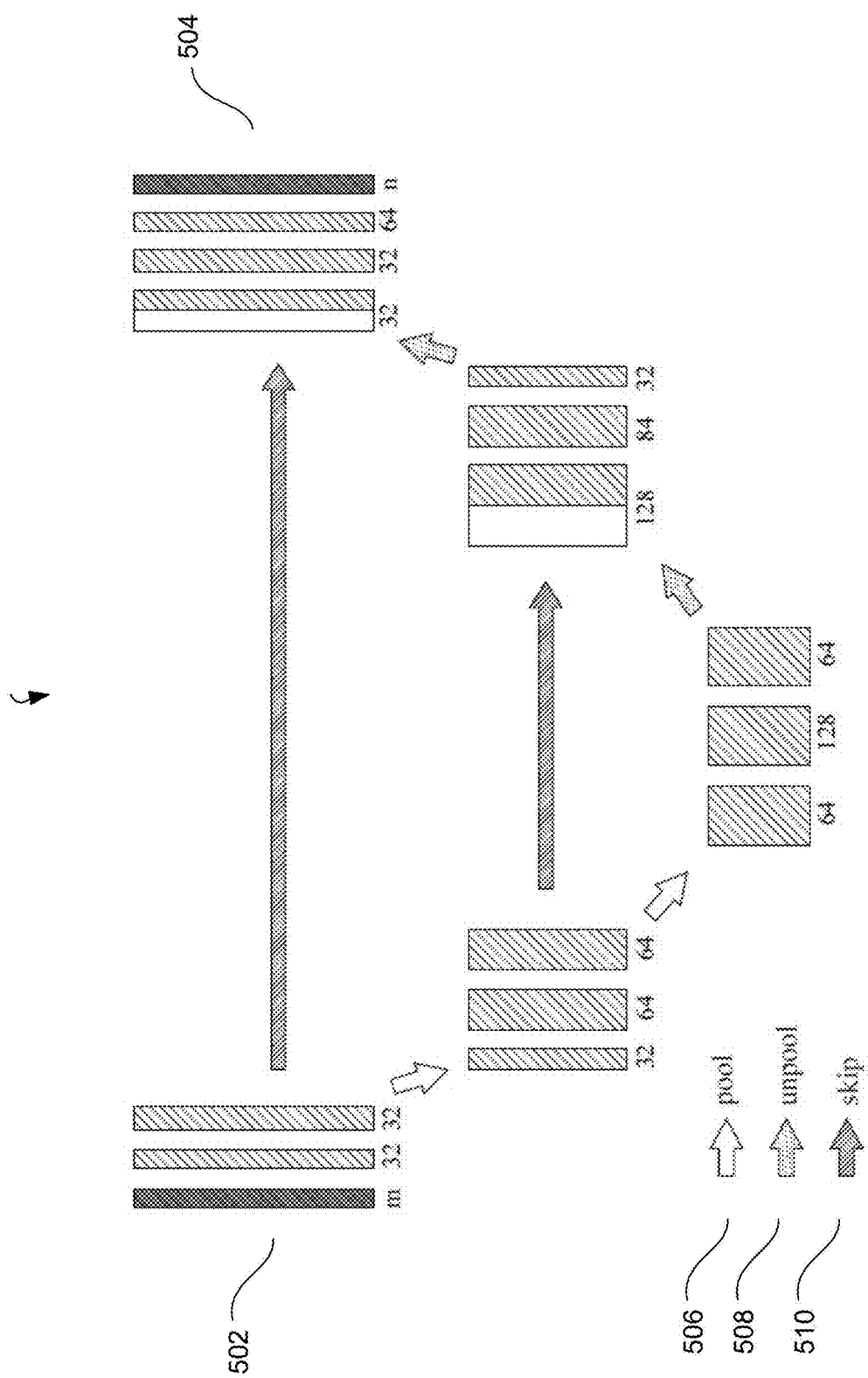
FIG. 5 is an illustration of an example of a full convolution network that can be used in the implementation of tangent convolution for 3D data in accordance with various examples described herein.

FIG. 5 is an illustration of an example of a full convolution network 500 that can be used in the implementation of tangent convolution for 3D data in accordance with various examples described herein. By way of example only and not limitation, convolutional network 500 is a fully-convolutional network over 3D data such as a point cloud, where the convolutions are tangent convolutions. The example convolutional network 500 represents an encoder-decoder network similar to a standard U-net type of convolutional network, where the encoder has two pooling layers 506 and the decoder has corresponding two unpooling layers 508. Encoder features are propagated to corresponding decoder blocks via skip connections 510. All layers except the last one use 3×3 filters and are followed by a leaky rectified linear unit (ReLU) with a negative slope of 0.2. The last layer uses 1×1 convolutions to produce final class predictions. In one embodiment, the convolutional network 500 is trained by optimizing the cross-entropy objective using an Adam optimizer with initial learning rate 10×4.

Figure 6:
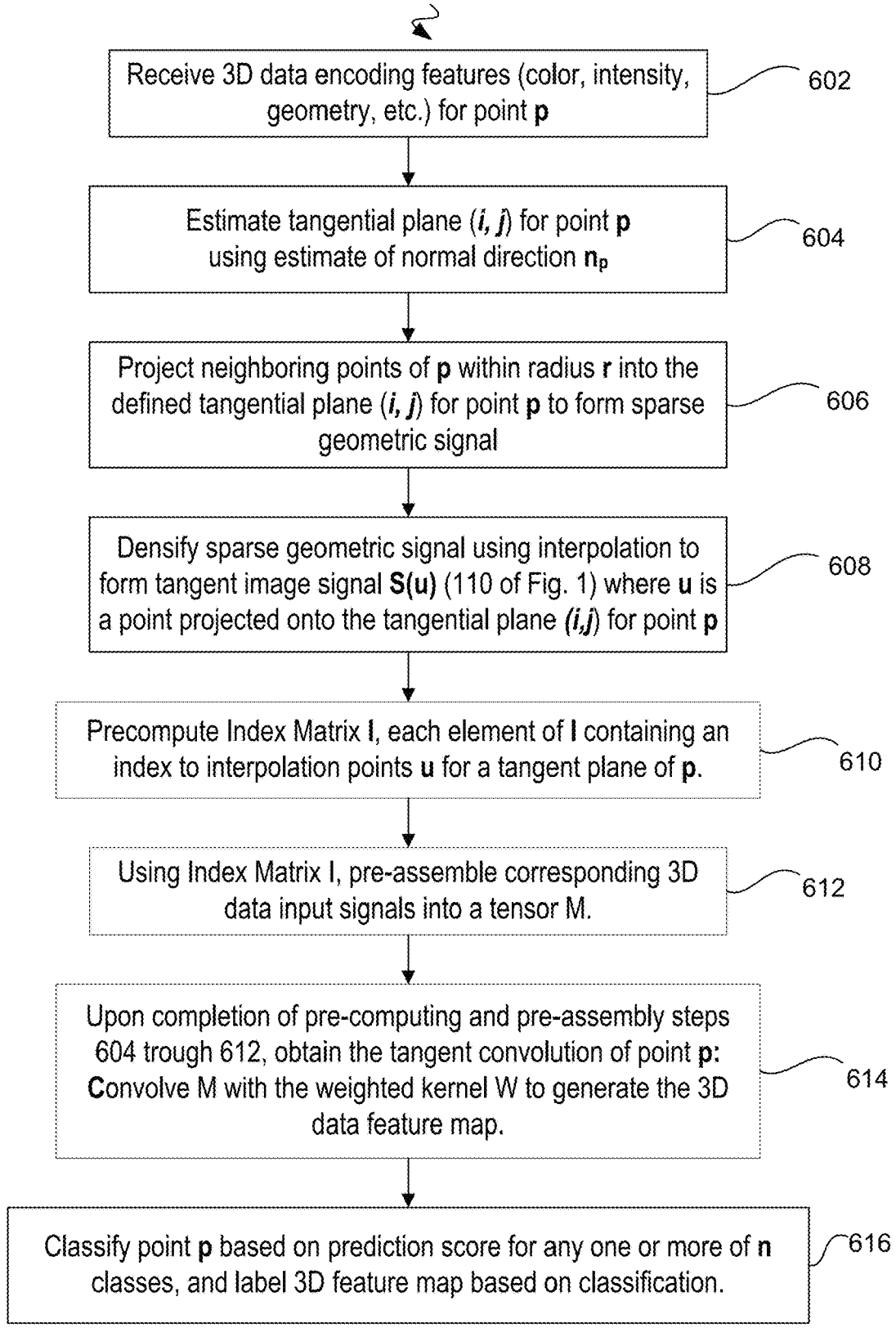
FIG. 6 is a flow diagram illustrating embodiments of processes performed to implement tangent convolution for 3D data in accordance with various examples described herein.

FIG. 6 is a flow diagram illustrating embodiments of processes performed to implement tangent convolution for 3D data in accordance with various examples described herein. A tangent convolution process 600 begins at 602 to receive 3D data encoding features for all points p in the 3D data, such as a point cloud or mesh. In preparation for tangent convolution of points p in the 3D data, at 604 the tangent convolution process estimates the tangent plane (i, j) for each point p using an estimate of normal direction $n_p$. At 606 the process projects neighboring points of each point p within radius r into the defined tangent plane (i, j) for point p to form a sparse geometric signal. At 608, the process densifies the sparse geometric signal using interpolation to form a tangent image signal S(u), where u represents a point projected onto the tangent plane (i, j). At 610, the process pre-computes the Index Matrix I, where each element of I contains an index to the 3D data points u that represent the neighboring points projected onto the tangent plane of p and used for interpolation of the tangent image signal. At 612, the process uses the Index Matrix I to pre-assemble into a tensor M all of the corresponding 3D data input signals to which the elements of the Index Matrix I refer.

In one embodiment, upon completion of the pre-computation and pre-assembly processes 604-612, at process 614, the tangent convolution process 600 obtains the tangent convolution of each point p in the received 3D data by convolving M with a pre-computed weighted kernel W to generate the output 3D data feature map. Lastly, at 616, the process 600 classifies each point p based on prediction score of p for any one or more of n classes and labels the 3D feature map based on the classification.

Figure 7:
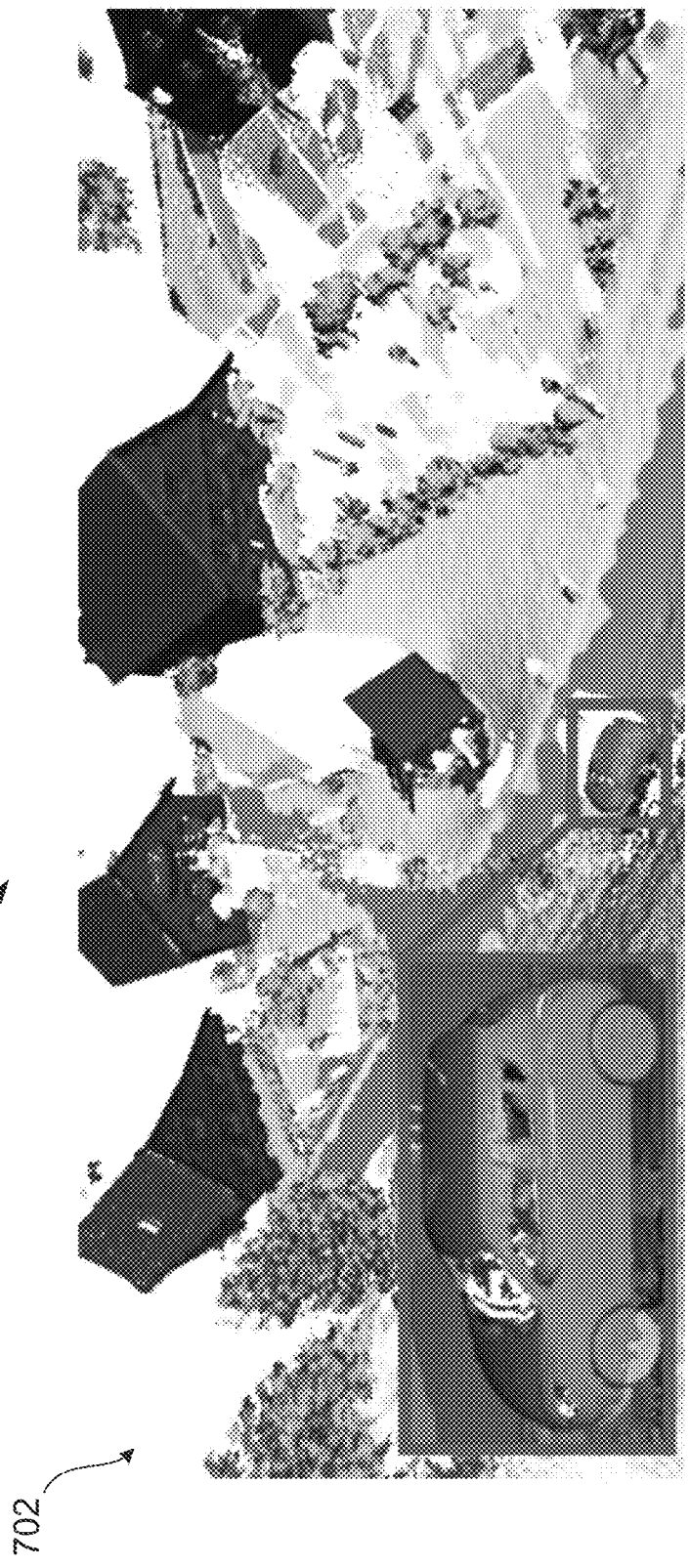
FIG. 7 illustrates an example classification of test 3D data resulting from tangent convolution of 3D data in accordance with various embodiments described herein.

FIG. 7 illustrates an example classification 700 of test 3D data resulting from tangent convolution of 3D data in accordance with various embodiments described herein. A 3D feature map 702 generated using tangent convolution 702 applied to a 3D data set illustrates the classifications of the surfaces detected during image processing. The classifications are shown in colors that correspond to the classes shown in color key 704. By way of example only, and not limitation, the color key 704 illustrates eight example classifications as might be employed for 3D data captured from outdoor scenes and used in autonomous navigation applications for computer vision, e.g., man-made terrain, natural terrain, high vegetation, low vegetation, building, hardscape, scanning artifacts and cars. In this example the 3D data is a data set for a scene from a large scale point cloud classification benchmark (www.semantic3d.net). The 3D feature map 702 is highly comparable to a reference 3D feature map for this scene in the benchmark. The accuracy of the semantic segmentation reflected in 3D feature map 702 is also greater than that achieved with conventional convolution techniques applied to the same benchmark scene.

Figure 8:
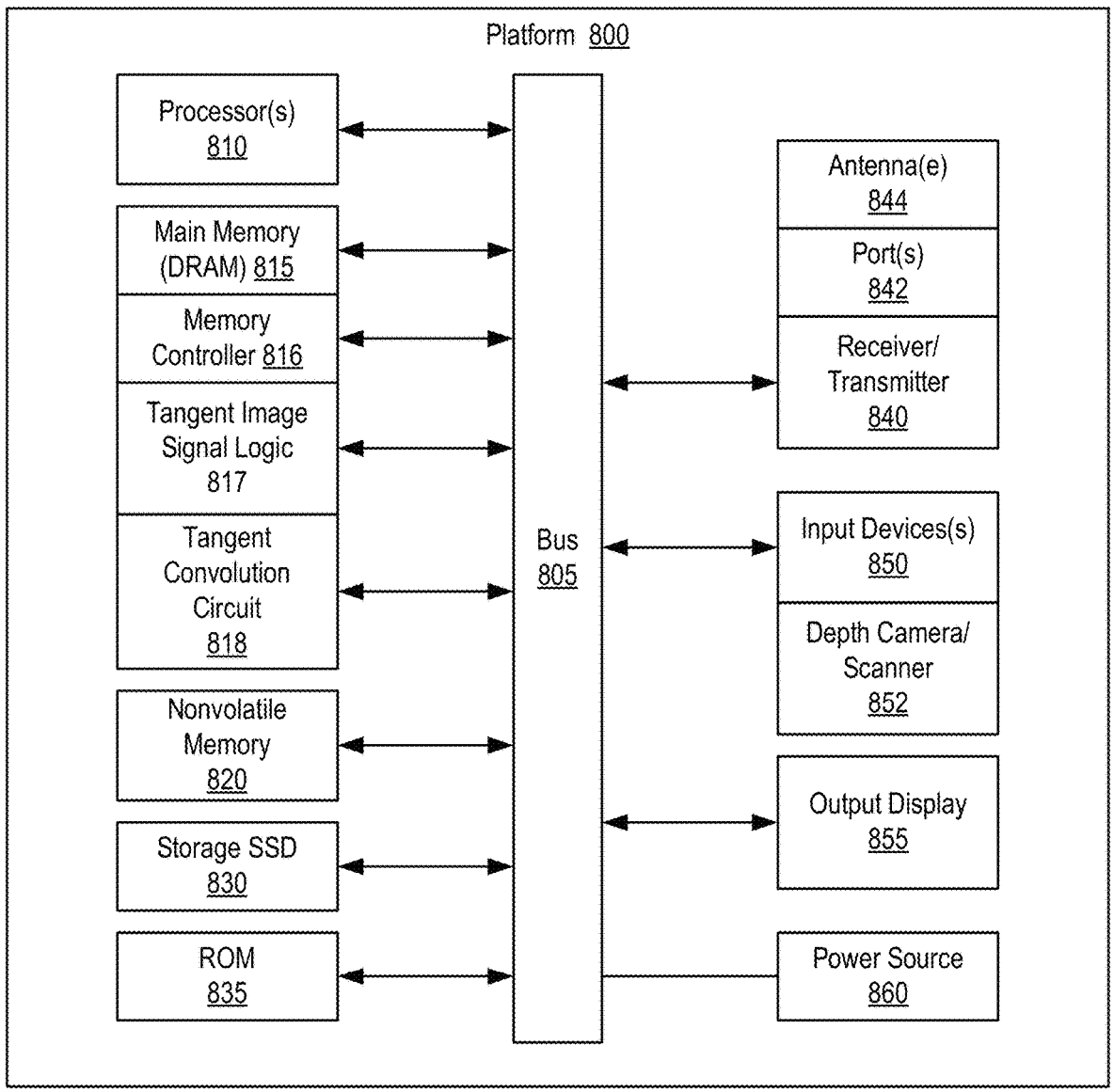
FIG. 8 is a schematic, block diagram illustration of a typical computer system in which embodiments of tangent convolution of 3D data could be implemented, either in whole or in part, in accordance with various examples described herein.

FIG. 8 is an illustration of a system in which tangent convolution for 3D data can be implemented according to an embodiment. In this illustration, certain standard and well-known components that are not germane to the present description are not shown. Elements shown as separate elements may be combined, including, for example, a SoC (System on Chip) combining multiple elements on a single chip.

In some embodiments, a computing system such as platform 800 may include a processing means such as one or more processors 810 coupled to one or more buses or interconnects, shown in general as bus 805. The processors 810 may comprise one or more physical processors and one or more logical processors. In some embodiments, the processors may include one or more general-purpose processors or special-purpose processors.

The bus 805 is a communication means for transmission of data. By way of example only and not limitation, the bus 805 is illustrated as a single bus, but can represent multiple different interconnects or buses and the component connections to such interconnects or buses may vary. The bus 805 shown in FIG. 8 is an abstraction that represents any one or more separate physical buses, point-to-point connections, or both connected by appropriate bridges, adapters, or controllers.

In some embodiments, the computing system 800 further comprises a random access memory (RAM) or other dynamic storage device or element as a main memory 815 and memory controller 816 for storing information and instructions to be executed by the processors 810. Main memory 815 may include, but is not limited to, dynamic random access memory (DRAM). In some embodiments, the RAM or other dynamic storage device or element includes a tangent convolution circuit block 818 implementing tangent image signal logic 817 to provide the pre-computation and pre-assembly of the 3D data for carrying out tangent convolution in accordance with the described embodiments.

The computing system 800 also may comprise a non-volatile memory 820; a storage device such as a solid-state drive (SSD) 830; and a read only memory (ROM) 835 or other static storage device for storing static information and instructions for the processors 810.

In some embodiments, the computing system 800 includes one or more transmitters or receivers 840 coupled to the bus 805. In some embodiments, the computing system 800 may include one or more antennae 844, such as dipole or monopole antennae, for the transmission and reception of data via wireless communication using a wireless transmitter, receiver, or both, and one or more ports 842 for the transmission and reception of data via wired communications. Wireless communication includes, but is not limited to, Wi-Fi, Bluetooth™, near field communication, and other wireless communication standards.

In some embodiments, computing system 800 includes one or more input devices 850 for the input of data, including hard and soft buttons, a joy stick, a mouse or other pointing device, a keyboard, voice command system, or gesture recognition system. In one embodiment, the computing system 800 includes one or more depth cameras/scanners 852 to capture data used for image processing, including 3D data. The depth cameras/scanners can include RGB-D (red, green, blue, depth) sensors, and Lidar (Light Detection and Ranging) remote scanners.

In some embodiments, computing system 800 includes an output display 855, where the output display 855 may include a liquid crystal display (LCD) or any other display technology, for displaying information or content to a user. In some environments, the output display 855 may include a touch-screen that is also utilized as at least a part of an input device 850. Output display 855 may further include audio output, including one or more speakers, audio output jacks, or other audio, and other output to the user.

The computing system 800 may also comprise a battery or other power source 860, which may include a solar cell, a fuel cell, a charged capacitor, near field inductive coupling, or other system or device for providing or generating power in the computing system 800. The power provided by the power source 860 may be distributed as required to elements of the computing system 800.

It will be apparent from this description that aspects of the described embodiments could be implemented, at least in part, in software. That is, the techniques and methods described herein could be carried out in a data processing system in response to its processor executing a sequence of instructions contained in a tangible, non-transitory memory such as the memory 815 or the non-volatile memory 820 or a combination of such memories, and each of these memories is a form of a machine readable, tangible storage medium.

Hardwired circuitry could be used in combination with software instructions to implement the various embodiments. For example, aspects of the described embodiments can be implemented as software installed and stored in a persistent storage device, which can be loaded and executed in a memory by a processor (not shown) to carry out the processes or operations described throughout this application. Alternatively, the described embodiments can be implemented at least in part as executable code programmed or embedded into dedicated hardware such as an integrated circuit (e.g., an application specific IC or ASIC), a digital signal processor (DSP), a field programmable gate array (FPGA), or controller which can be accessed via a corresponding driver and/or operating system from an application. Furthermore, the described embodiments can be implemented at least in part as specific hardware logic in a processor or processor core as part of an instruction set accessible by a software component via one or more specific instructions.

Thus the techniques are not limited to any specific combination of hardware circuitry and software or to any particular source for the instructions executed by the data processing system.

All or a portion of the described embodiments can be implemented with logic circuitry, such as the above-described ASIC, DSP or FPGA circuitry, including a dedicated logic circuit, controller or microcontroller, or other form of processing core that executes program code instructions. Thus processes taught by the discussion above could be performed with program code such as machine-executable instructions that cause a machine that executes these instructions to perform certain functions. In this context, a "machine" is typically a machine that converts intermediate form (or "abstract") instructions into processor specific instructions (e.g. an abstract execution environment such as a "virtual machine" (e.g. a Java Virtual Machine), an interpreter, a Common Language Runtime, a high-level language virtual machine, etc.), and/or, electronic circuitry disposed on a semiconductor chip (e.g. "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture can be used to store program code. An article of manufacture that stores program code can be embodied as, but is not limited to, one or more memories (e.g. one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g. a server) to a requesting computer (e.g. a client) by way of data signals embodied in a propagation medium (e.g. via a communication link (e.g. a network connection)).

The term "memory" as used herein is intended to encompass all volatile storage media, such as dynamic random access memory (DRAM) and static RAM (SRAM) or other types of memory described elsewhere in this application. Computer-executable instructions can be stored on non-volatile storage devices, such as magnetic hard disk, an optical disk, and are typically written, by a direct memory access process, into memory during execution of software by a processor. One of skill in the art will immediately recognize that the term "machine-readable storage medium" includes any type of volatile or non-volatile storage device that is accessible by a processor.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The described embodiments also relate to an apparatus for performing the operations described herein. This apparatus can be specially constructed for the required purpose, or it may comprise a general-purpose computer selectively activated or reconfigured by a computer program stored in the computer. Either way, the apparatus provides the means for carrying out the operations described herein. The computer program can be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems can be used with programs in accordance with the teachings herein, or it may prove convenient to construct a more specialized apparatus to perform the operations described. The required structure for a variety of these systems will be evident from the description provided in this application. In addition, the embodiments are not described with reference to any particular programming language. It will be appreciated that a variety of programming languages could be used to implement the teachings of the embodiments as described herein.

Additional example implementations are as follows:

An example method, system, apparatus or computer-readable medium for processing three-dimensional (3D) data comprises estimating a tangent plane corresponding to a 3D data point in a plurality of 3D data points, computing a tangent image signal from one or more of the plurality of 3D data points associated with the estimated tangent plane, computing an index matrix of indices to the one or more 3D data points associated with estimated tangent planes corresponding to each 3D data point in the plurality of 3D data points, convolving each of the plurality of 3D data points based on the index matrix and a weighted convolution kernel, and generating a 3D feature map of the plurality of 3D data points based on the convolved 3D data points.

In another example implementation, estimating the tangent plane corresponding to the 3D data point includes estimating a surface normal of the 3D data point and defining the tangent plane orthogonal to a direction of the estimated surface normal of the 3D data point.

In another example implementation, the one or more points associated with the tangent plane are neighboring points projected onto the tangent plane based on their proximity to the 3D data point for which the tangent plane was defined.

In another example implementation, proximity to the 3D data point is based on a radius r of a spherical region within which the neighboring data points surround the 3D data point.

In another example implementation, the tangent image signal is interpolated from the one or more 3D data points associated with the tangent plane.

In another example implementation, the tangent image signal is interpolated using an interpolation scheme, the interpolation scheme including any one of nearest neighboring points, a full Gaussian mixture, and a Gaussian mixture for a selected three of the nearest neighboring points.

In another example implementation, computing the index matrix of indices to the one or more 3D data points associated with the estimated tangent planes is based on the interpolation scheme used to interpolate each of the tangent image signals for each of the estimated tangent planes.

In another example implementation, processing three-dimensional (3D) data further comprises assembling into a tensor each of the one or more 3D data points associated with estimated tangent planes indexed in the index matrix, convolving the tensor with the weighted convolution kernel, and generating the 3D feature map of the plurality of 3D data points based on the convolved tensor.

In the foregoing specification, embodiments have been described with reference to specific exemplary embodiments or implementations. It will be evident that various modifications could be made to the described embodiments or implementations without departing from the broader spirit and scope of the embodiments or implementations as set forth in the following claims. The specification and drawings are, accordingly, to be regarded in an illustrative sense rather than a restrictive sense.

What is claimed is:

1. A computer-implemented system for processing three-dimensional (3D) data comprising:
   at least one memory;
   at least one processor communicatively coupled to the memory;
   at least one channel of a plurality of 3D data points;
   a tangent convolution circuit operated by the at least one processor to:
     for each of the plurality of 3D data points:
       estimate a tangent plane corresponding to a 3D data point, and
       compute a tangent image signal from one or more points associated with the tangent plane;
     compute an index matrix of indices to the 3D data for the one or more points associated with the tangent planes; and
     convolve each of the plurality of 3D data points based on the index matrix and a weighted convolution kernel to generate a 3D feature map of the plurality of 3D data points.

2. The computer-implemented system of claim 1, wherein to estimate a tangent plane corresponding to a 3D data point is to:
   estimate a surface normal of the 3D data point; and
   define the tangent plane orthogonal to a direction of the estimated surface normal of the 3D data point.

3. The computer-implemented system of claim 2, wherein the one or more points associated with the tangent plane are neighboring points projected onto the tangent plane based on their proximity to the 3D data point for which the tangent plane was defined.

4. The computer-implemented system of claim 3, wherein proximity to the 3D data point is based on a radius r of a spherical region within which the neighboring data points surround the 3D data point.

5. The computer-implemented system of claim 1, wherein the tangent image signal is interpolated from the one or more points associated with the tangent plane.

6. The computer-implemented system of claim 5, wherein the tangent image signal is interpolated using an interpolation scheme, the interpolation scheme including any one of nearest neighboring points, a full Gaussian mixture, and a Gaussian mixture for a selected three of the nearest neighboring points.

7. The computer-implemented system of claim 6, wherein to compute the index matrix of indices to the 3D data for the one or more points associated with the tangent planes is based on the interpolation scheme used to interpolate the tangent image signals for the tangent planes.

8. The computer-implemented system of claim 1, wherein, to convolve each of the plurality of 3D data points based on the index matrix and a weighted convolution kernel, the tangent convolution circuit operated by the at least one processor is further to:
   assemble into a tensor the 3D data points corresponding to the one or more points associated with the tangent planes indexed in the index matrix; and
   convolve the tensor with the weighted kernel to generate the 3D feature map of the plurality of 3D data points.

9. A computer-implemented method for processing three-dimensional (3D) data comprising:
   estimating a tangent plane corresponding to a 3D data point in a plurality of 3D data points;
   computing a tangent image signal from one or more of the plurality of 3D data points associated with the estimated tangent plane;
   computing an index matrix of indices to the one or more 3D data points associated with estimated tangent planes corresponding to each 3D data point in the plurality of 3D data points;
   convolving each of the plurality of 3D data points based on the index matrix and a weighted convolution kernel; and
   generating a 3D feature map of the plurality of 3D data points based on the convolved 3D data points.

10. The computer-implemented method of claim 9, wherein estimating the tangent plane corresponding to the 3D data point includes:
    estimating a surface normal of the 3D data point; and
    defining the tangent plane orthogonal to a direction of the estimated surface normal of the 3D data point.

11. The computer-implemented method of claim 10, wherein the one or more points associated with the tangent plane are neighboring points projected onto the tangent plane based on their proximity to the 3D data point for which the tangent plane was defined.

12. The computer-implemented method of claim 11, wherein proximity to the 3D data point is based on a radius r of a spherical region within which the neighboring data points surround the 3D data point.

13. The computer-implemented method of claim 9, wherein the tangent image signal is interpolated from the one or more 3D data points associated with the tangent plane.

14. The computer-implemented method of claim 13, wherein the tangent image signal is interpolated using an interpolation scheme, the interpolation scheme including any one of nearest neighboring points, a full Gaussian mixture, and a Gaussian mixture for a selected three of the nearest neighboring points.

15. The computer-implemented method of claim 14, wherein computing the index matrix of indices to the one or more 3D data points associated with the estimated tangent planes is based on the interpolation scheme used to interpolate each of the tangent image signals for each of the estimated tangent planes.

16. The computer-implemented method of claim 9, further comprising:
  assembling into a tensor each of the one or more 3D data points associated with estimated tangent planes indexed in the index matrix; and
  convolving the tensor with the weighted convolution kernel; and
  generating the 3D feature map of the plurality of 3D data points based on the convolved tensor.

17. At least one machine readable medium comprising a plurality of instructions executable by a system to cause the system to:
  estimate a tangent plane corresponding to a 3D data point in a plurality of 3D data points;
  compute a tangent image signal from one or more of the plurality of 3D data points associated with the estimated tangent plane;
  compute an index matrix of indices to the one or more 3D data points associated with estimated tangent planes corresponding to each 3D data point in the plurality of 3D data points;
  convolve each of the plurality of 3D data points based on the index matrix and a weighted convolution kernel; and
  generate a 3D feature map of the plurality of 3D data points based on the convolved 3D data points.

18. The at least one computer-readable medium of claim 17, the plurality of instructions to estimate the tangent plane corresponding to the 3D data point further cause the system to:
  estimate a surface normal of the 3D data point; and
  define the tangent plane orthogonal to a direction of the estimated surface normal of the 3D data point.

19. The at least one computer-readable medium of claim 18, wherein:
  the one or more points associated with the tangent plane are neighboring points projected onto the tangent plane based on their proximity to the 3D data point for which the tangent plane was defined, wherein proximity to the 3D data point is based on a radius r of a spherical region within which the neighboring data points surround the 3D data point;
  the tangent image signal is interpolated from the one or more 3D data points associated with the tangent plane using an interpolation scheme, the interpolation scheme including any one of nearest neighboring points, a full Gaussian mixture, and a Gaussian mixture for a selected three of the nearest neighboring points; and
  the index matrix of indices to the one or more 3D data points associated with the estimated tangent planes is based on the interpolation scheme used to interpolate each of the tangent image signals for each of the estimated tangent planes.

20. The at least one computer-readable medium of claim 17, the plurality of instructions to convolve each of the plurality of 3D data points based on the index matrix and a weighted convolution kernel further cause the system to:
  assemble into a tensor each of the one or more 3D data points associated with estimated tangent planes indexed in the index matrix; and
  convolve the tensor with the weighted convolution kernel; and
  generate the 3D feature map of the plurality of 3D data points based on the convolved tensor.

* * * * *